Jan. 8, 1935.  M. F. CARGILL  1,986,957
FILTER HOLDER
Filed Sept. 17, 1934
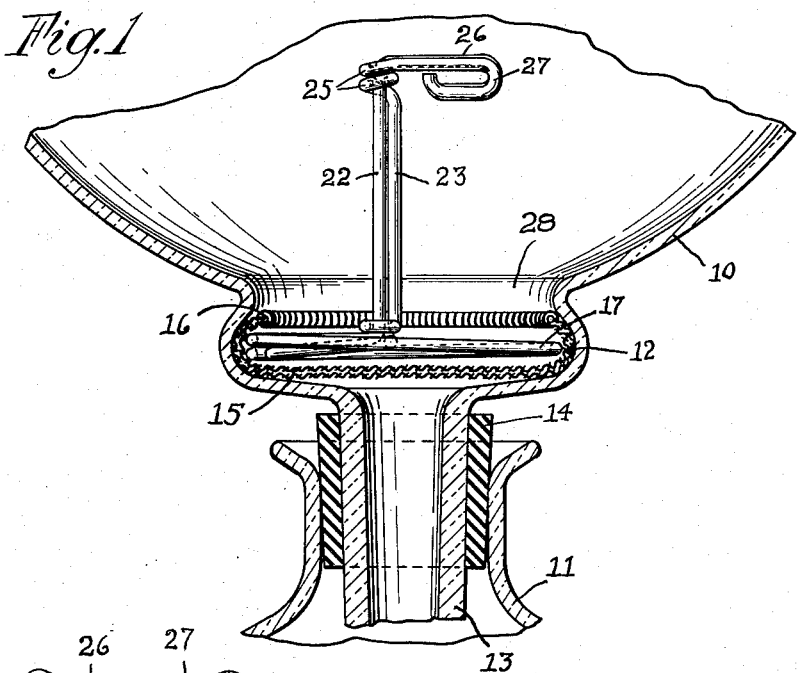
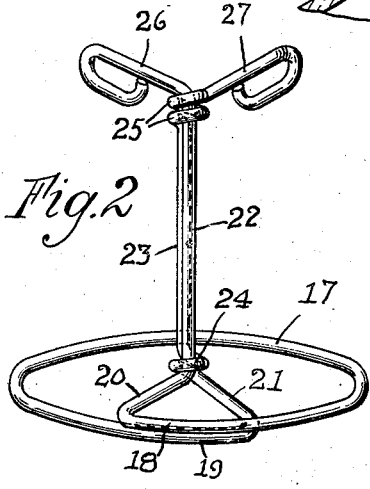
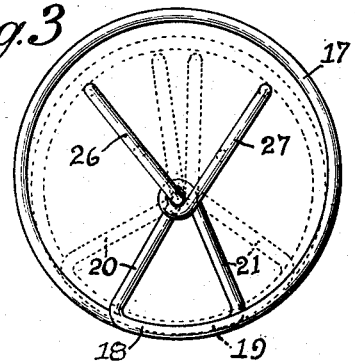
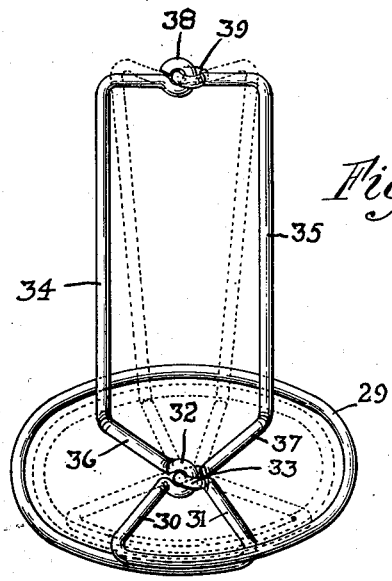
Inventor.
Maxwell F. Cargill Patented Jan. 8, 1935

1,986,957

UNITED STATES PATENT OFFICE 1,986,957

FILTER HOLDER

Maxwell F. Cargill, Maywood, Ill., assignor to Edward Perlman, Chicago, Ill.

Application September 17, 1934, Serial No. 744,342

5 Claims. (Cl. 210—162)

This invention relates to improvements in filter holders.

Glass coffee brewers generally are provided with filters through which the brew passes from an upper to a lower bowl. It is desirable that the filters be so held that none of the coffee grounds escape around the filter into the lower bowl. Some filter holders press marginal portions of the filters against the bottom of the upper bowls, while other holders are designed to cooperate with an annular channel or groove formed in the lower side wall of the bowl to prevent passage of coffee grounds around the filter and into the lower bowl. It is to the latter type holders that the present improvements relate.

One object of the invention is to provide a filter holder constructed preferably of a single piece of resilient material such as spring wire, for example, and which comprises a resilient ring which will press a marginal portion of the filter into uniform contact with the annular walls of upper bowls, notwithstanding that the diameters of such walls may vary in different bowls.

A further object of the invention is to provide a filter holder having a resilient filter pressing ring provided with means for contracting the ring throughout its circumference to facilitate the insertion of the ring into, and its removal from, not only a cupped filter cloth, but also the annular channel of the upper bowl where, upon expansion, it will press the filter cloth into uniform contact with the channel wall and prevent the passage of coffee grounds into the lower bowl.

A further object of the invention is to provide a resilient filter holder comprising a spring ring having inwardly directed co-planar pivoted arms for contracting the ring, which arms being shorter than the radius of the expanded ring, may contract the ring to substantially a perfect circle of such diameter as to be readily insertable into the annular channel or seat in the upper bowl.

A further object of the invention is to provide a contractible filter holder having finger pieces or handles disposed adjacent the center of the upper bowl and so arranged that the holder can be contracted conveniently for removal from the bowl.

Other objects relate to various features of construction and arrangement of parts which will be apparent from a consideration of the following specification and accompanying drawing, wherein Figure 1 is a broken vertical sectional view through a glass coffee brewing apparatus showing a filter held in position therein by one of the improved filter holders.

Figure 2 is a perspective view of a filter holder.

Figure 3 is a top plan view of the holder.

Figure 4 is a perspective view of a modification thereof.

In the drawing, 10 indicates the top bowl of a conventional glass coffee brewing apparatus and 11 the lower bowl. The upper bowl is provided with an annular filter seat 12, which terminates in a downwardly extending tube 13 which is secured to the neck of the lower bowl by means of a flexible stopple 14. The filter 15 preferably is somewhat cup shaped and formed of two layers of fabric having a draw string 16 in the upper edge thereof for retaining the filter in the shape mentioned.

The features of the coffee brewing apparatus referred to are well known and form no part of the present invention.

The filter holder, as shown in Figures 1, 2 and 3, is formed preferably of a single piece of spring wire, and has the intermediate portion of the wire formed in a ring 17, the ends 18 and 19 of which overlap as illustrated in Figure 2. The diameter of the ring is such that when the ring is in the position shown in Figure 1, it will hold the filter cloth firmly against the annular seat 12 and prevent the passage of coffee grounds between the filter and the wall. The ends 18 and 19 of the ring are extended inwardly to form arms 20 and 21 respectively. As illustrated the arms converge and are directed upwardly to form stems 22 and 23, the latter of which is shown as being twisted at 24 and preferably again at 25 around the stem 22 to pivotally connect the same, and to prevent relative longitudinal movement thereof and consequent vertical separation of the ends 18 and 19 of the ring. The upper ends of the wire then extend laterally to form operating finger pieces 26 and 27, as illustrated.

It will be seen that as the finger pieces or handles 26 and 27 are pressed one toward the other, the stems 22 and 23 will be rotated and the arms 20 and 21 swung away from each other and thereby effect the contraction of the ring 17.

By contracting the ring its insertion in the cup-shaped filter 15 is facilitated, as is also the passage of the ring through the reduced portion 28 of the bowl 10. Upon releasing the finger pieces 26 and 27, the resiliency of the spring ring causes the same to expand and press the filter firmly against the seat 12 of the bowl 10.

As indicated in Figure 3, the arms 20 and 21 are of a length less than the diameter of the fully expanded ring which is shown in full lines in said figure. In fact, the length of the arms 20 and 21 preferably are approximately equal to the radius of the spring when in such contracted position that it will pass freely through the reduced opening 28 of the bowl with the filter cloth thereon. Thus in Figure 3 the ring is shown in contracted position in dotted lines. The ends 18 and 19 of the ring being not connected together, the ring is free to flex throughout its entire circumference and as the contraction takes place the outer ends of the arms 20 and 21 due to the shortened length thereof, do not project beyond the ring when contracted. The ring thus contracts into substantially a perfect circle of a diameter which enables it to pass freely through the constriction 28 of the upper bowl.

It will also be noted that while the stems 22 and 23 are off-set slightly from the center of the bowl 10, the handles or finger pieces 26 and 27 are disposed substantially centrally of the bowl where it is convenient for the user to engage them when the removal of the filter is necessary. The length of the stems 22 and 23 may be varied as desired, but they are preferably of such length that the finger pieces will always be above the coffee grounds after the coffee making operation has been completed.

In Figure 4 the ring 29 is likewise freely contractible throughout its entire circumference, and has the ends turned inwardly to form arms 30 and 31, each of which is provided with an eye 32 and 33, respectively, which when interlocked as shown form a pivotal point for the arms. The length of the arms 30 and 31 is also less than the radius of the fully expanded ring and preferably approximately equal to the radius of the ring when in contracted position.

The stems 34 and 35 have horizontal portions 36 and 37 respectively extending from the eyes above mentioned which portions are disposed substantially in the plane of the ring similar to the arms 30 and 31 and arms 20 and 21 of the previously described embodiment of the invention. The ends of the single piece of spring wire of which the filter holder shown in Figure 4 is constructed, are provided with interlocking eyes 38 and 39. By compressing the stems 34 and 35 toward each other to approximately the dotted line positions shown in Figure 4, the arms 30 and 31 are swung away from each other and cause the uniform contraction of the ring as will be seen. Both forms of the filter holder illustrated being formed each of a single piece of resilient wire, afford minimum metallic contact with the coffee brew, which is considered desirable. The filter holders also afford practically no recess where coffee grounds can accumulate, since they can readily be cleansed by rinsing them.

While I have illustrated certain embodiments of my invention for the purpose of illustration, I do not wish to be restricted specifically thereto except as so limited by the appended claims.

I claim:

1. A filter holder comprising a flexible ring having inwardly turned arms, said arms terminating in upwardly directed pivotally connected stems, and spaced finger pieces at the upper ends of said stems by means of which the ring can be contracted.

2. A filter holder comprising a contractible resilient ring having inwardly turned arms of a length less than the radius of said ring when expanded, said arms terminating in upwardly extending stems pivotally secured together, and finger pieces at the upper ends of said stems for turning the same to effect pivotal movement of said arms and contraction of said ring.

3. A filter holder comprising a contractible resilient ring having inwardly directed arms terminating in vertical stems, one of said stems being bent about the other to pivotally secure said stems together, and spaced finger pieces at the upper ends of said stems adapted to be pressed toward each other to rotate said stems and arms in a direction to effect the contraction of said ring.

4. A filter holder comprising a contractible resilient ring having overlapping ends terminating in pivotally-connected inwardly-directed arms lying substantially in the plane of said ring, and upwardly extended means for moving said arms about the pivotal connection to contract said ring, said arms being of a length not greater than the radius of the ring when contracted to predetermined minimum diameter whereby the outer ends of the arms remain within the circumference of the ring when the same has been contracted to said minimum diameter.

5. A one-piece resilient wire filter holder comprising a ring having over-lapping ends terminating in inwardly directed convergent arms pivotally connected together, and manually operable members integral with said arms for moving the same pivotally to effect contraction of said ring.

MAXWELL F. CARGILL.